US011452089B2

(12) United States Patent
Venugopal et al.

(10) Patent No.: US 11,452,089 B2
(45) Date of Patent: Sep. 20, 2022

(54) SIGNALING TO ACTIVATE UPLINK TRIGGER STATES

(71) Applicant: QUALCOMM Incorporated, San Diego, CA (US)

(72) Inventors: Kiran Venugopal, Raritan, NJ (US); Yan Zhou, San Diego, CA (US); Tianyang Bai, Somerville, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/118,533

(22) Filed: Dec. 10, 2020

(65) Prior Publication Data

US 2021/0195565 A1 Jun. 24, 2021

Related U.S. Application Data

(60) Provisional application No. 62/966,940, filed on Jan. 28, 2020, provisional application No. 62/953,176, filed on Dec. 23, 2019.

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01)

(58) Field of Classification Search
CPC .......................... H04W 72/042; H04L 5/0048
See application file for complete search history.

(56) References Cited

U.S. PATENT DOCUMENTS

| 2019/0199496 | A1* | 6/2019 | Qin ...................... H04B 7/0695 |
| 2019/0349864 | A1* | 11/2019 | Zhang .................. H04W 52/16 |
| 2020/0106647 | A1* | 4/2020 | Chen ................. H04W 72/0473 |
| 2021/0135816 | A1* | 5/2021 | Davydov .............. H04L 5/0091 |

OTHER PUBLICATIONS

International Search Report and Written Opinion—PCT/US2020/064690—ISA/EPO—dated Mar. 10, 2021.

(Continued)

*Primary Examiner* — Ronald B Abelson
(74) *Attorney, Agent, or Firm* — Procopio, Cory, Hargreaves & Savitch LLP/Qualcomm

(57) ABSTRACT

A configuration to configure a UE to activate a subset of configured SRS trigger states. The apparatus receives a configuration activating a subset of configured SRS trigger states. The apparatus receives DCI in a PDCCH triggering an aperiodic SRS transmission based on one or more SRS trigger states of activated SRS trigger states. The apparatus determines an aperiodic SRS resource set based on the configuration and the DCI indicating the one or more SRS trigger states. The apparatus transmits aperiodic SRS within the aperiodic SRS resource set.

22 Claims, 9 Drawing Sheets

(56) References Cited

OTHER PUBLICATIONS

Mediatek Inc: "Clarifications on Beam Management", 3GPP Draft, 3GPP TSG RAN WG1 Meeting AH1801, R1-1800159_BM_FINAL, 3rd Generation Partnership Project (3GPP), vol. RAN WG1, No. Vancouver, Jan. 22, 2018-Jan. 26, 2018, Jan. 13, 2018 (Jan. 13, 2018), XP051384649, 10 Pages, Retrieved from the Internet: URL:http://www.3gpp.org/ftp/tsg%5Fran/WG1%5FRL1/TSGR1%5FAH/NR%5FAH%5F1801/Docs/[retrieved on Jan. 13, 2018] p. 1, 1 Introduction pp. 3-7, 3. Configuration for UL Beam Management.

Nokia, et al., "Remaining Issues on Beam Management", 3GPP Draft, R1-1805104, 3GPP TSG RAN WG1 Meeting #92bis, 3GPP, vol. RAN WG1, No. Sanya, CN, Apr. 16, 2018-Apr. 20, 2018, Apr. 15, 2018, XP051427363, 7 pages, Retrieved from Internet: URL: http://www.3gpp.org/ftp/Meetings%5F3GPP%5FSYNC/RAN1/Docs/,[retrieved Apr. 15, 2018] 4.2 Baseline solution 4.3 Solution for enhanced power saving possibilities 5.2 on Potential Impact on Beam Management, p. 1, 2 Default TCI State, pp. 1-4,3 PUSCH BeamIndication, p. 12, 7.3.1.1.2 Format 0_1.

VIVO: "Remaining on SRS Design", 3GPP Draft, 3GPP TSG RAN WG1 Meeting #92, R1-1801527_Remaining Issues on SRS, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 15, 2018 (Feb. 15, 2018), XP051396779, 4 Pages, Retrieved from the Internet: URL: http://www.3gpp.org/ftp/tsg%5Fran/WG1%5FRL1/TSGR1%5F92/Docs/, [retrieved on Feb. 15, 2018], Sections 1, 2.1, the Whole Document.

ZTE, et al., "Remaining Issues on Beam Management", 3GPP Draft, R1-1803908, 3GPP TSG RAN WG1 Meeting #92-bis, Remaining Details on Beam Management, 3rd Generation Partnership Project (3GPP), vol. RAN WG1, No. Sanya, China, Apr. 16, 2018-Apr. 20, 2018, Apr. 15, 2018 (Apr. 15, 2018), XP051426201, 6 Pages, Retrieved from the Internet: URL: http://WWW.3gpp.org/ftp/Meetings%5F3GPP%5FSYNC/RAN1/Docs/, [retrieved on Apr. 15, 2018] p. 1, 1 Introduction pp. 1-2, 2 Beam Measurement p. 3, 3.3 on SRS.

\* cited by examiner

SIGNALING TO ACTIVATE UPLINK TRIGGER STATES

CROSS REFERENCE TO RELATED APPLICATION(S)

This application claims the benefit of U.S. Provisional Application Ser. No. 62/953,176, entitled "Signalling to Activate Uplink Trigger States" and filed on Dec. 23, 2019, which is expressly incorporated by reference herein in its entirety. This application also claims the benefit of U.S. Provisional Application Ser. No. 62/966,940, entitled "Signalling to Activate Uplink Trigger States" and filed on Jan. 28, 2020, which is expressly incorporated by reference herein in its entirety.

BACKGROUND

Technical Field

The present disclosure relates generally to communication systems, and more particularly, to a configuration for signaling to activate uplink trigger states.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives a configuration activating a subset of configured sounding reference signal (SRS) trigger states. The apparatus receives downlink control information (DCI) in a physical downlink control channel (PDCCH) triggering an aperiodic SRS transmission based on one or more SRS trigger states of activated SRS trigger states. The apparatus determines an aperiodic SRS resource set based on the configuration and the DCI indicating the one or more SRS trigger states. The apparatus transmits aperiodic SRS within the aperiodic SRS resource set.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), a configuration activating a subset of configured sounding reference signal (SRS) trigger states. The apparatus transmits, to the UE, downlink control information (DCI) in a physical downlink control channel (PDCCH) triggering an aperiodic SRS transmission based on one or more SRS trigger states of activated SRS trigger states. The apparatus receives, from the UE, aperiodic SRS in an aperiodic SRS resource set based on the DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
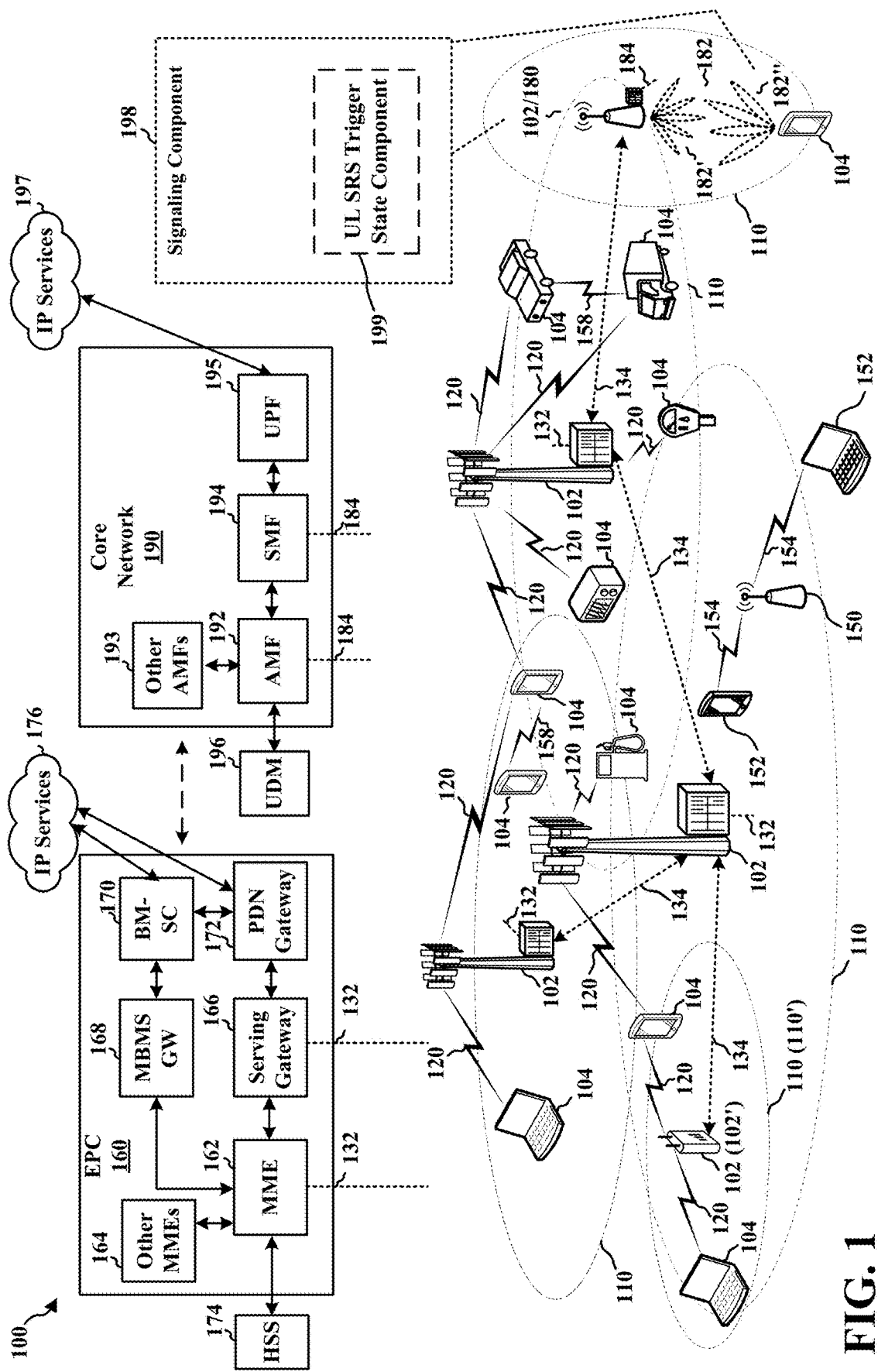
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to activate a subset of configured SRS trigger states. For example, the UE 104 may include a signaling component 198 that includes a UL SRS trigger state component 199. The UE 104 may receive a configuration activating a subset of configured SRS trigger states. The UE 104 may receive DCI in a PDCCH triggering an aperiodic SRS transmission based on one or more SRS trigger states of activated SRS trigger states. the UE 104 may determine an aperiodic SRS resource set based on the configuration and the DCI indicating the one or more SRS trigger states. The UE 104 may transmit aperiodic SRS within the aperiodic SRS resource set.

Referring again to FIG. 1, in certain aspects, the base station 180 may be configured to configure a UE to activate a subset of configured SRS trigger states. For example, the base station 180 may include a signaling component 198 that includes a UL SRS trigger state component 199. The base station 180 may transmit, to a UE, a configuration activating a subset of configured SRS trigger states. The base station 180 may transmit, to the UE, DCI in a PDCCH triggering an aperiodic SRS transmission based on one or more SRS trigger states of activated SRS trigger states. The base station 180 may receive, from the UE 104, aperiodic SRS in an aperiodic SRS resource set based on the DCI.

Although the following description may be focused on 5G NR, the concepts described herein may be applicable to other similar areas, such as LTE, LTE-A, CDMA, GSM, and other wireless technologies.

Figure 2:
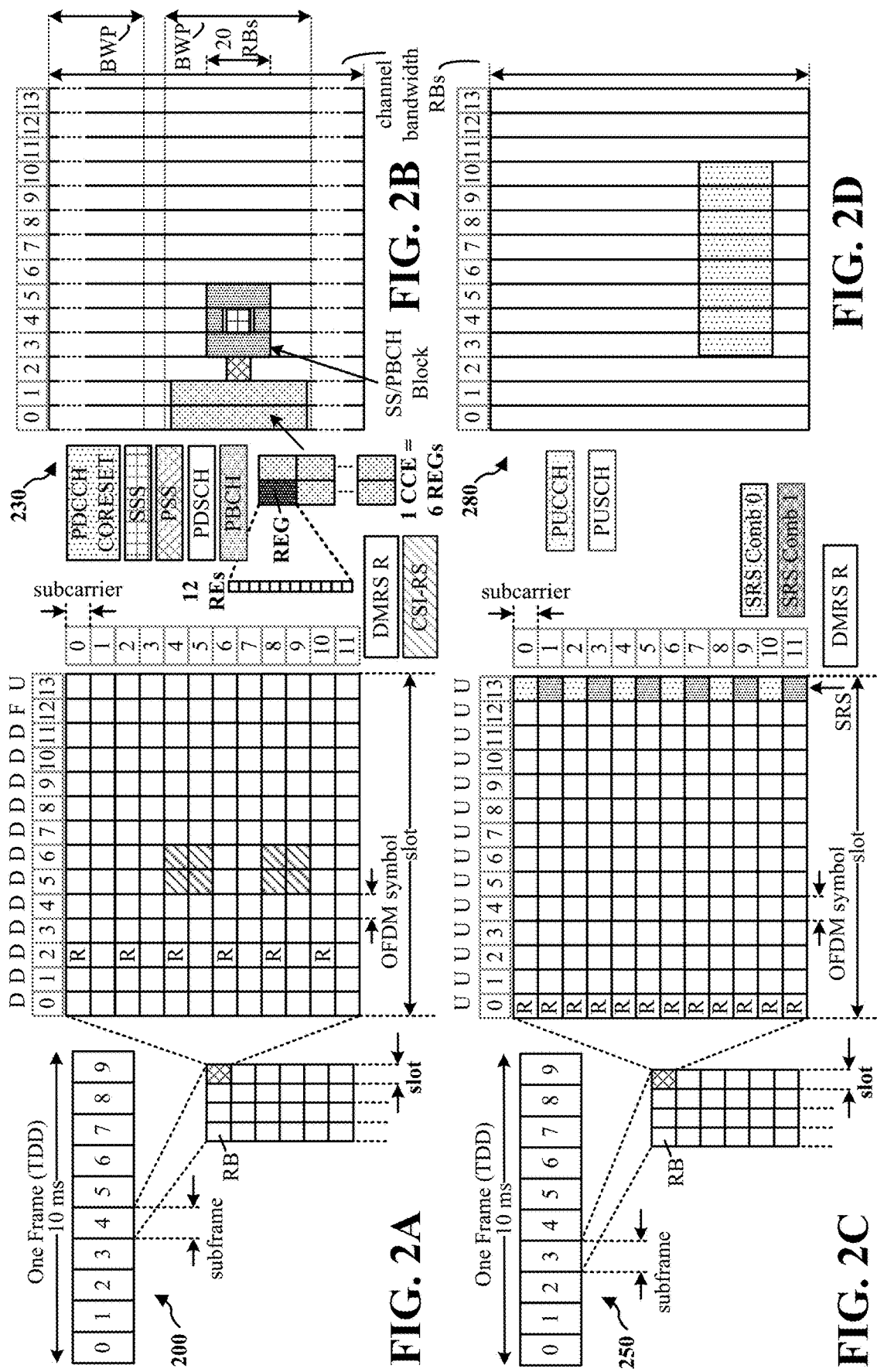
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The PDCCH carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit SRS. The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
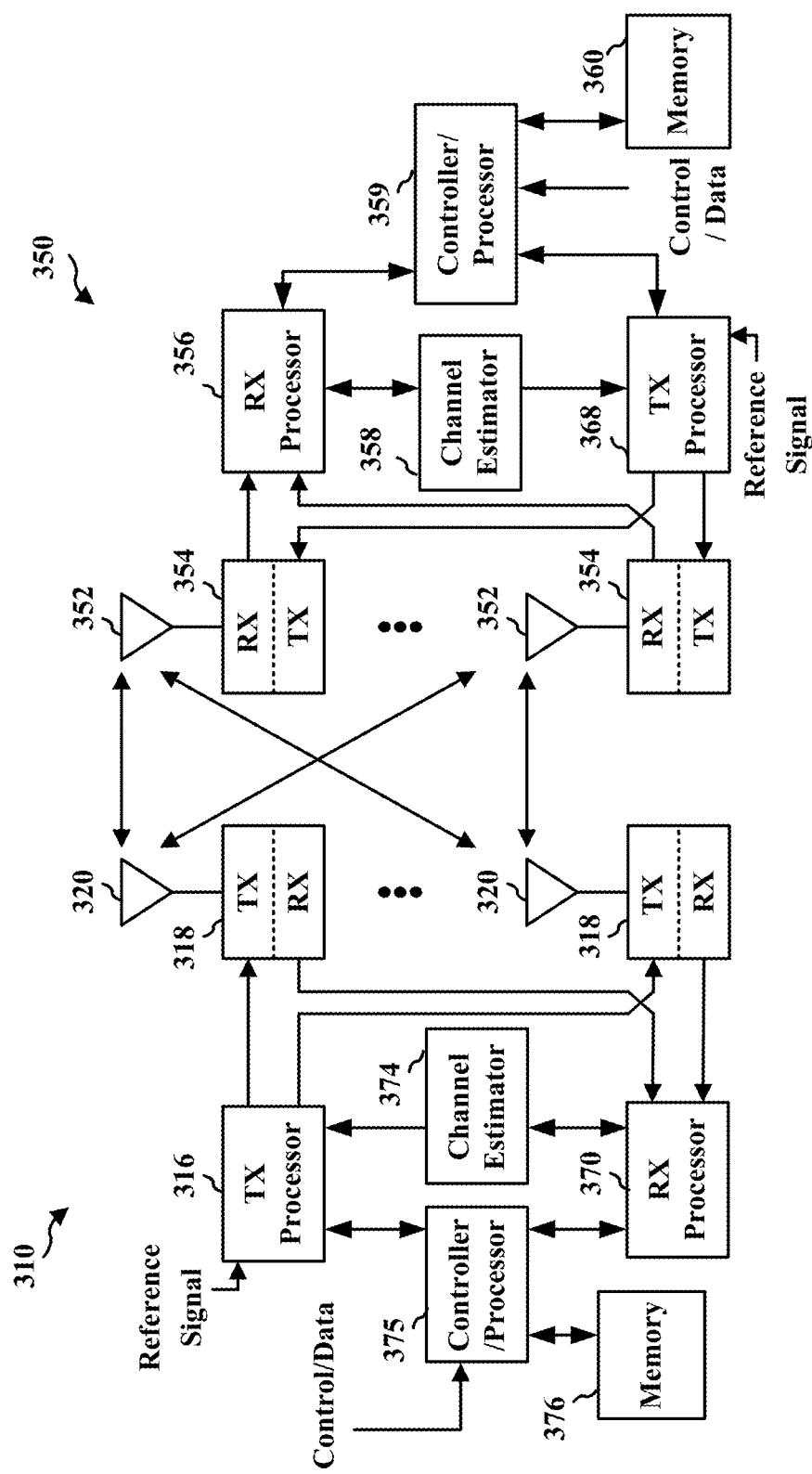
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

In an RRC configuration of mapping between the SRS trigger state and the aperiodic SRS resource set, a subset of DL channel measurements reference signals (RSs) may be activated using MAC control element (CE) (MAC-CE) through RRC. However, in the RRC configuration merely up to 3 aperiodic SRS resource sets may be triggered by DCI. For example, when a BS triggers a UL measurement through DCI, 2 bits of SRS request may limit measurement capabilities. Further, for a different SRS configuration a new RRC trigger may be utilized.

A subset of configured SRS trigger states can be activated by MAC-CE. In one configuration, content per SRS trigger state may be RRC configured. Content of aperiodic SRS trigger state sub-selection DCI/MAC-CE may be similar to the MAC-CE for aperiodic CSI-RS trigger state sub-selection. In one configuration, activated SRS trigger states may be sequentially mapped to the SRS trigger state codepoint in a triggering DCI.

Figure 4:
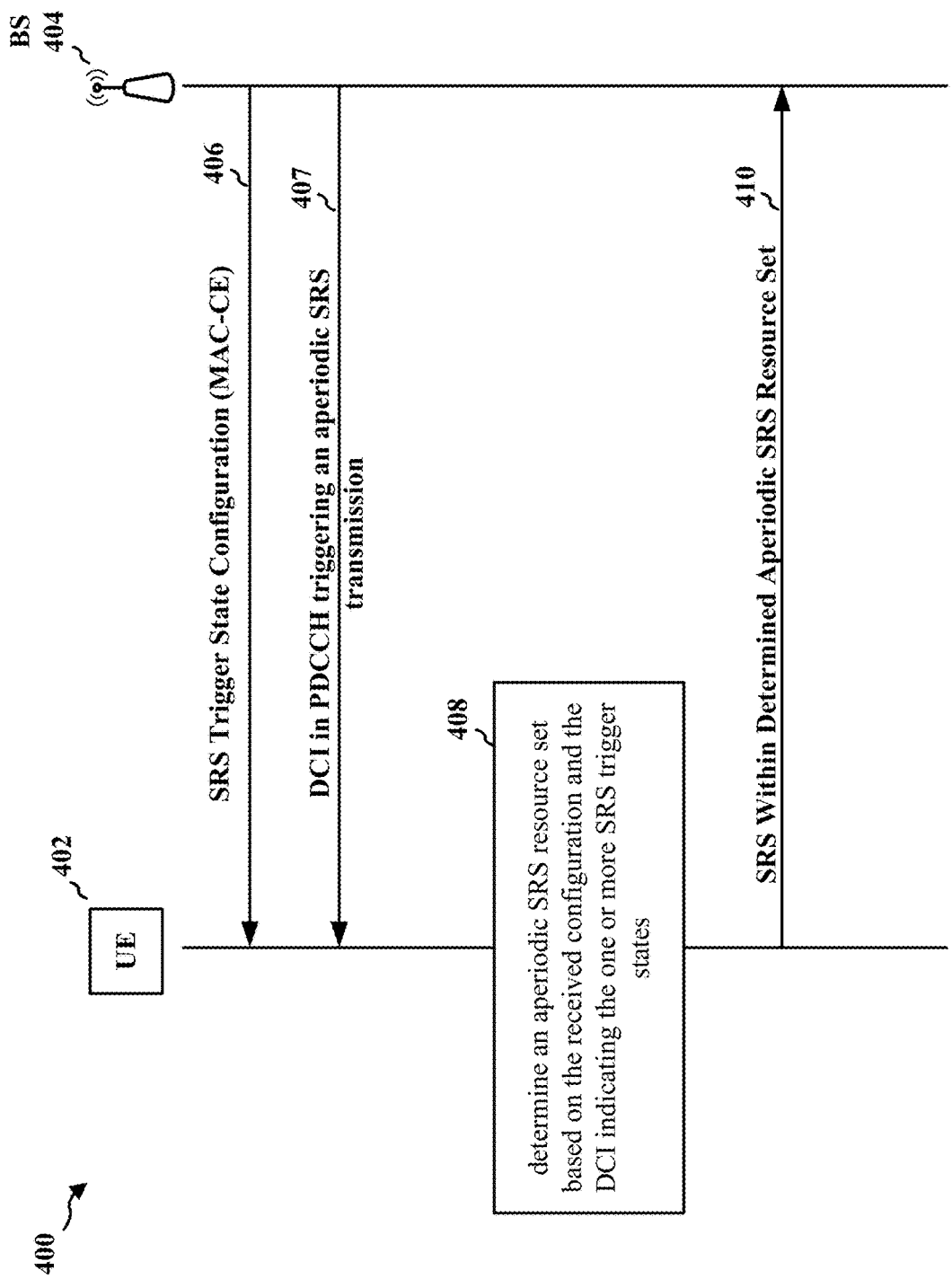
FIG. 4 is a call flow diagram illustrating signaling for activating a subset of configure d SRS trigger states.

FIG. 4 is a call flow diagram 400 of signaling between a UE 402 and a base station 404. The base station 404 may be configured to provide at least one cell. The UE 402 may be configured to communicate with the base station 404. For example, in the context of FIG. 1, the base station 404 may correspond to base station 102/180 and, accordingly, the cell may include a geographic coverage area 110 in which communication coverage is provided and/or small cell 102' having a coverage area 110'. Further, a UE 402 may correspond to at least UE 104. In another example, in the context of FIG. 3, the base station 404 may correspond to base station 310 and the UE 402 may correspond to UE 350.

As illustrated in FIG. 4, a UE 402 receives, from a base station 404, an SRS trigger state configuration 406 activating a subset of configured SRS trigger states. The UE 402 may receive the SRS trigger state configuration 406 (for example, the configuration 500 as described below with reference to FIG. 5) activating a subset of configured SRS trigger states, where the SRS trigger states specify an aperiodic SRS resource set to be used for transmitting an aperiodic SRS. For example, the UE 402 may receive the configuration 406 through a MAC-CE. The SRS trigger state configuration 406 may include an SRS trigger state identifier(s) of an SRS trigger state(s) to be activated. Each of the activated SRS trigger states may be associated with at least one of time-frequency resources, a timing behavior (e.g., a slot/symbol offset at which an aperiodic SRS should be transmitted when a DCI trigger is obtain d in a specific slot), or a transmission control indicator (TCI) state for transmitting an aperiodic SRS. Further, each of the activated SRS trigger states may be associated with a TCI state for transmitting the aperiodic SRS.

As further illustrated in FIG. 4, the UE 402 receives, from the base station 404, a DCI 407 in a PDCCH triggering an aperiodic SRS transmission based on one or more SRS trigger states of the activated SRS trigger states. In one configuration, the DCI 407 may include one or more codepoint values indicating the one or more SRS trigger states of the activated SRS trigger states. For example, the DCI 407 may be resource constrained in terms of the number of bits that can be included in the DCI 407. Therefore, instead of including a bit sequence to specify the one or more SRS trigger states, the DCI 407 may include a coded sequence (e.g., a codepoint value to specify the one or more SRS trigger states as described below with reference to FIG. 5). The codepoint value may be within a set of one or more codepoint values indicating the one or more SRS trigger states of the activated SRS trigger states (e.g., the activated SRS trigger states based on the SRS trigger state configuration 406). In some aspects, the codepoint value may be specified using three bits (for example to indicate one of codepoint 0, codepoint 1, ... codepoint 7 as described below with reference to FIG. 5).

The UE 402 determines an aperiodic SRS resource set 408 based on the received SRS trigger state configuration 406 and the DCI 407 indicating the one or more SRS trigger states. For example, the UE 402 may determine the aperiodic SRS resource set 408 based on one or more SRS trigger states of the activated SRS trigger states indicated by the DCI 407. In some aspects, the UE 402 may have a mapping between the one or more activated SRS trigger states (i.e., the SRS trigger states activated by the SRS trigger state configuration 406) and a set of codepoint values. The one or more codepoint values included in the DCI 407 are within the set of codepoint values. In some aspects, the UE 402 may receive the mapping between the one or more activated SRS trigger states and the set of codepoint values from the base station 404.

The UE 402 transmits, to the base station 404, aperiodic SRS 410 within the determined aperiodic SRS resource set 408. The aperiodic SRS 410 may be transmitted based on at least one of time-frequency resources, timing behavior, or a TCI state associated with the one or more SRS trigger states indicated by the DCI 407. Further, the SRS 410 may be transmitted with a quasi-co location (QCL) property the same or similar as a reference signal associated with the one or more SRS trigger states. The QCL property may be at least one of a one or more port indications, a Doppler shift, a Doppler spread, an average delay, a delay spread, a spatial Tx parameter, or a spatial Rx parameter. The reference signal may be associated with a panel identifier (ID) of the UE 402. The reference signal may be one of SRS, or a downlink RS (DL RS). Further, the DL RS may be one of CSI-RS, DM-RS for at least one of a PDSCH or a PDCCH, or a synchronization signal/physical broadcast channel (PBCH) (SS/PBCH) block.

Figure 5:
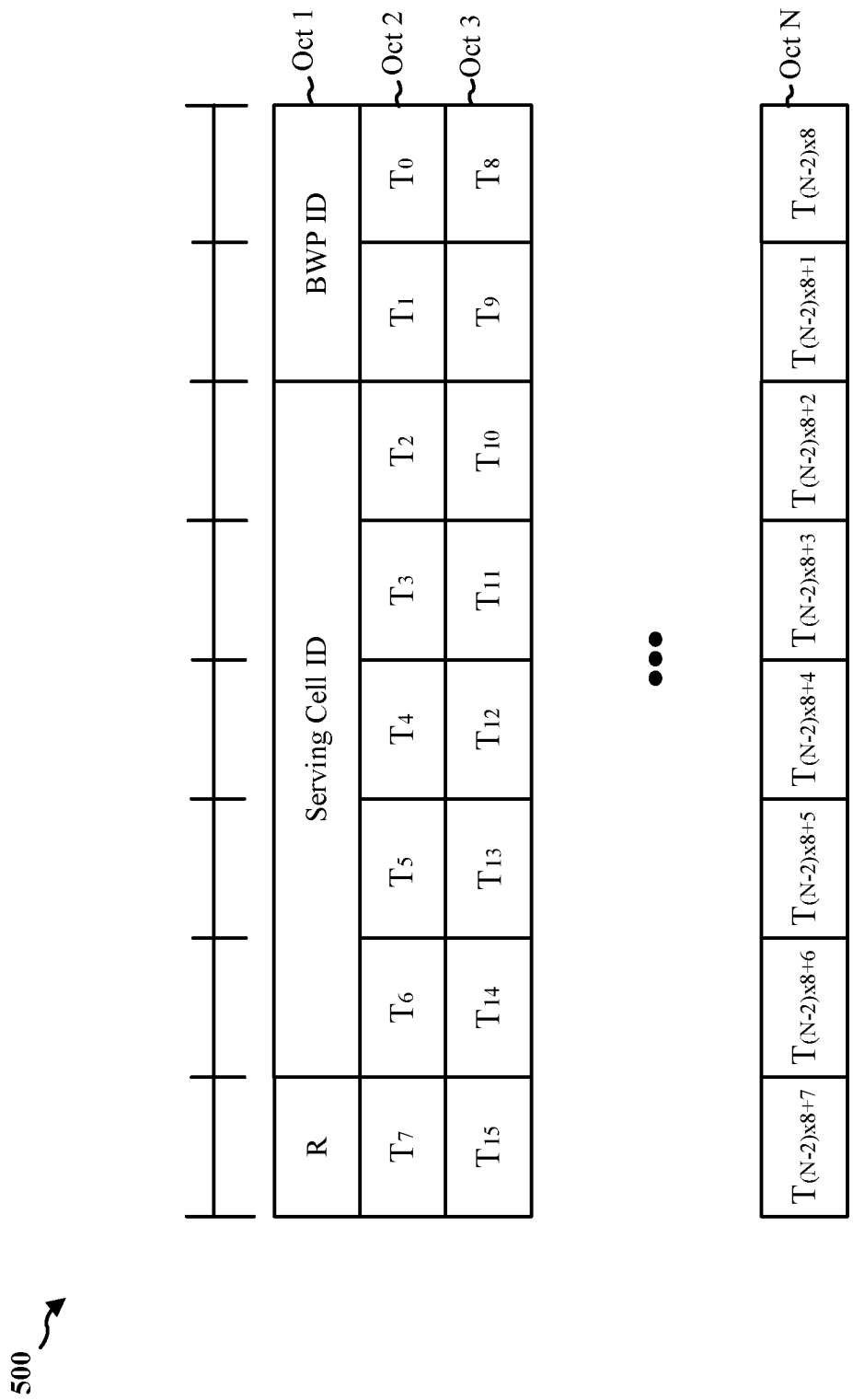
FIG. 5 is an example aperiodic SRS trigger state configuration.

FIG. 5 is a diagram illustrating an example SRS trigger state configuration 500. For example, the SRS trigger state configuration 500 may be similar to the SRS trigger state configuration 406 received through the MAC-CE (as described above with reference to FIG. 4). The SRS trigger state configuration 500 may include Oct 1, Oct 2, Oct 3, ..., Oct N blocks. The Oct blocks may include one or more bits that correspond to SRS trigger states to be activated (as described above with reference to FIG. 4). For example, Oct 1 may define the format (bit locations and length of sub-blocks) of the blocks. Oct 2, Oct 3, ... Oct N and include a serving cell ID (with a length of 5 bits), a Bandwidth PartID (BWP ID) (with a length of 2 bits), and a reserve bit (R). Oct 2 may include bits $T_0$-$T_7$ and Oct 3 may include bits $T_8$-$T_{15}$. Similarly, Oct N may include bits $T_{(N-2)\times 8}$-$T_{(N-2)\times 8+7}$. The list (a subset) of SRS trigger states activated/deactivated in the SRS trigger state configuration 500 may be configured by the bitmap represented by bits $T_0$-$T_{(N-2)\times 8}$. For example, if a bit in a specific location is set to be '1', it means that it activates an SRS trigger state mapped to the position of the bit. For example, if the bit is set to be '0', it means that it deactivates an SRS trigger state mapped to the position of the bit. For example, if T4=1, it activates the index 4. The list of bit position that are set to be '1' is assigned to a small table called codepoint and the max size of the codepoint may be 8. It means that up to 8 bit fields in a MAC-CE can be set to be '1'. The position of '1' bits are assigned to codepoint in an increasing order. For example, if the fields T4, T10, T11, T19, T25, T40, T45 and T50 are set to be '1' and all other bits are set to be '0', then the codepoint may set to be as follows:

codepoint 0=4
codepoint 1=10
codepoint 2=11
codepoint 3=19
codepoint 4=25
codepoint 5=40
codepoint 6=45
codepoint 7=50

In one configuration, SRS trigger states in a DCI may be indicated using a codepoint value. The codepoint values may represent a bitmap to indicate one or more SRS trigger states. For example, the DCI 407 (as described above with reference to FIG. 4) may include a codepoint value (e.g., 0 for codepoint 0, 1 for codepoint 1, etc.) to indicate SRS trigger states for transmitting the SRS 410. As described above in FIG. 4, the DCI 407 may include 3 bits to specify the codepoint value (codepoint 0, codepoint 1 ... codepoint 7). Activated SRS trigger states may be sequentially mapped to the SRS trigger states codepoint in a scheduling DCI (e.g., the DCI 407 as described above with reference to FIG. 4). The SRS trigger states indicated by the codepoint value in the DCI 407 may be associated with the aperiodic SRS resource set 408 for transmitting the SRS 410. The aperiodic SRS resource set 408 may include at least one of the time-frequency resources, the timing behavior, or the TCI state associated with the one or more SRS trigger states indicated by the DCI 407.

Figure 6:
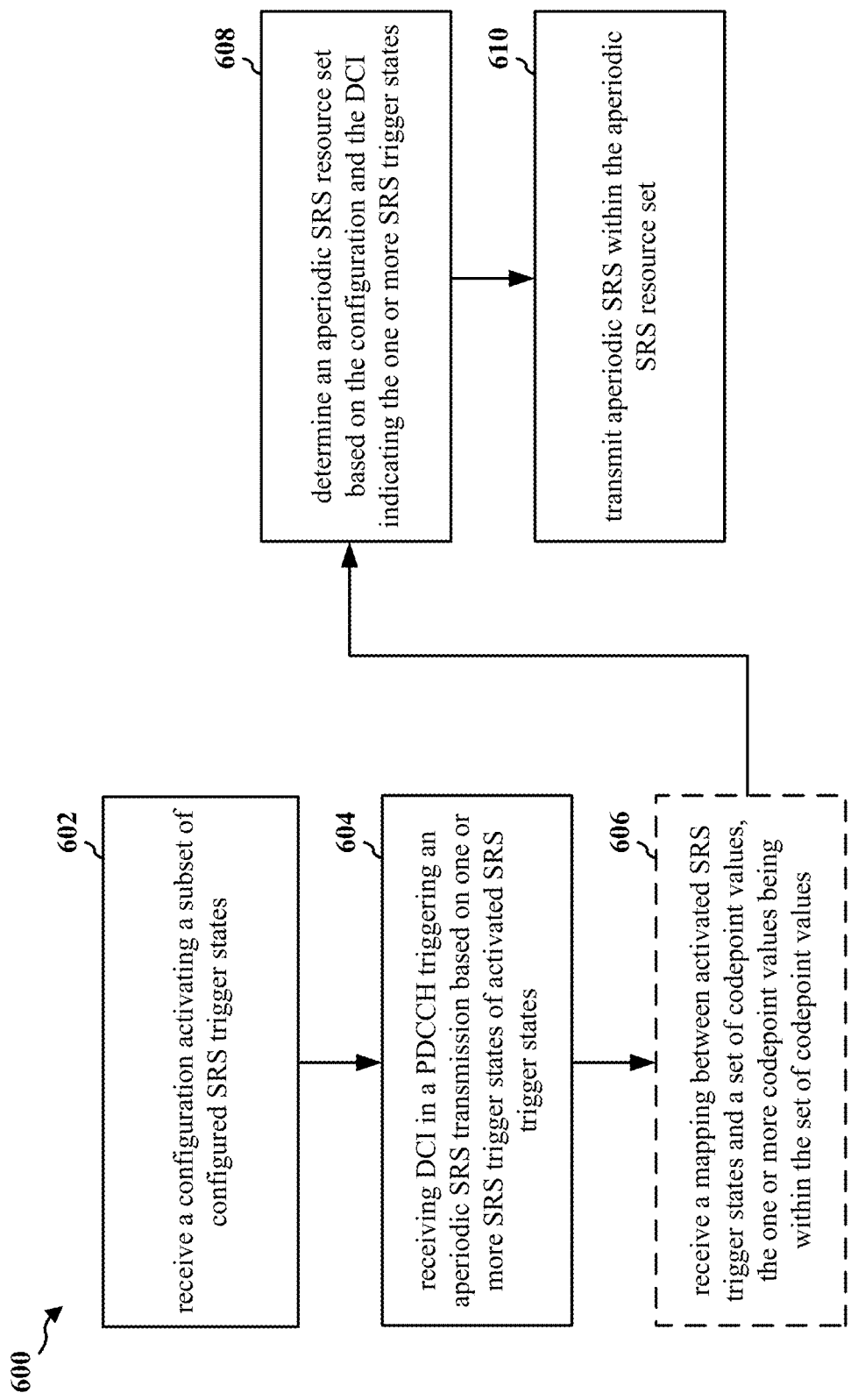
FIG. 6 is a flowchart of a method of wireless communication.

FIG. 6 is a flowchart 600 of a method of wireless communication. The method may be performed by a UE or a component of a UE (e.g., the UE 104, 402; the apparatus 702; the cellular baseband processor 704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to activate a subset of configured SRS trigger states.

At 602, the UE receives a configuration activating a subset of configured SRS trigger states. For example, 602 may be performed by configuration component 740 of apparatus 702. For example, with reference to FIGS. 4, 5, the UE 402 may receive the SRS trigger state configuration 406/500 activating a subset of configured SRS trigger states through the MAC-CE from the base station 404. In some aspects, the configuration activating the subset of configured SRS trigger states may be received through MAC-CE.

At 604, the UE receives a DCI in a PDCCH triggering an aperiodic SRS transmission.

For example, 604 may be performed by trigger component 742 of apparatus 702. The UE receives the DCI in the PDCCH triggering the aperiodic SRS transmission based on one or more SRS triggers states of activated SRS trigger states. For example, the UE 402 may receive the DCI 407 in the PDCCH as described with reference to FIG. 4. In some aspects, the DCI includes one or more codepoint values indicating the one or more SRS trigger states of the activated SRS trigger states. For example, as described with reference to FIGS. 4 and 5, the DCI 407 may include a codepoint value to indicate the one or more SRS trigger states of the activated SRS trigger states (i.e., the activated SRS trigger states based on the SRS trigger state configuration 406). In some aspects, each of the activated SRS trigger states is associated with at least one of time-frequency resources, a timing behavior, or a TCI state for transmitting the aperiodic SRS. In some aspects, each of the activated SRS trigger states is associated with the TCI state for transmitting the aperiodic SRS.

In some aspects, for example at 606, the UE receives a mapping between activated SRS trigger states and a set of codepoint values. For example, 606 may be performed by map component 744 of apparatus 702. The one or more codepoint values (e.g., included in the DCI) may be within the set of codepoint values.

At 608, the UE determines an aperiodic SRS resource set. For example, 608 may be performed by determination component 746 of apparatus 702. The UE may determine the aperiodic SRS resource set based the configuration activating the subset of configured SRS trigger states and the DCI indicating the one or more SRS trigger states. For example, as described with reference to FIG. 4, the UE 402 may determine the aperiodic SRS resource set 408 based on the received SRS trigger state configuration 406 and the received DCI 407 indicating the one or more SRS trigger states.

At 610, the UE transmits aperiodic SRS within the aperiodic SRS resource set. For example, 610 may be performed by aperiodic SRS component 748 of apparatus 702. For example, the UE 402 may transmit the aperiodic SRS 410 within the determined aperiodic SRS resource set 408, as described with reference to FIG. 4. The UE 402 may transmit the aperiodic SRS based on the at least one of the time-frequency resources, the timing behavior, or the TCI state associated with the one or more SRS trigger states (e.g., the one or more SRS trigger states indicated by the DCI 407, as described in FIG. 4). In some aspects, the aperiodic SRS may be transmitted based on the at least one of the time-frequency resources, the timing behavior, or the TCI state associated with the one or more SRS trigger states. In some aspects, transmitting the aperiodic SRS comprises transmitting the aperiodic SRS with a QCL property the same or similar as a reference signal associated with the one or more SRS trigger states. The reference signal may be further associated with a panel ID of the UE. In some aspects, the reference signal is one of SRS, or DL RS. The DL RS may be one of CSI-RS, DM-RS for at least one of a PDSCH or a PDCCH, or a SS/PBCH block. In some aspects, the QCL property may include at least one of a one or more port indications, a Doppler shift, a Doppler spread, an average delay, a delay spread, a spatial Tx parameter, or a spatial Rx parameter.

Figure 7:
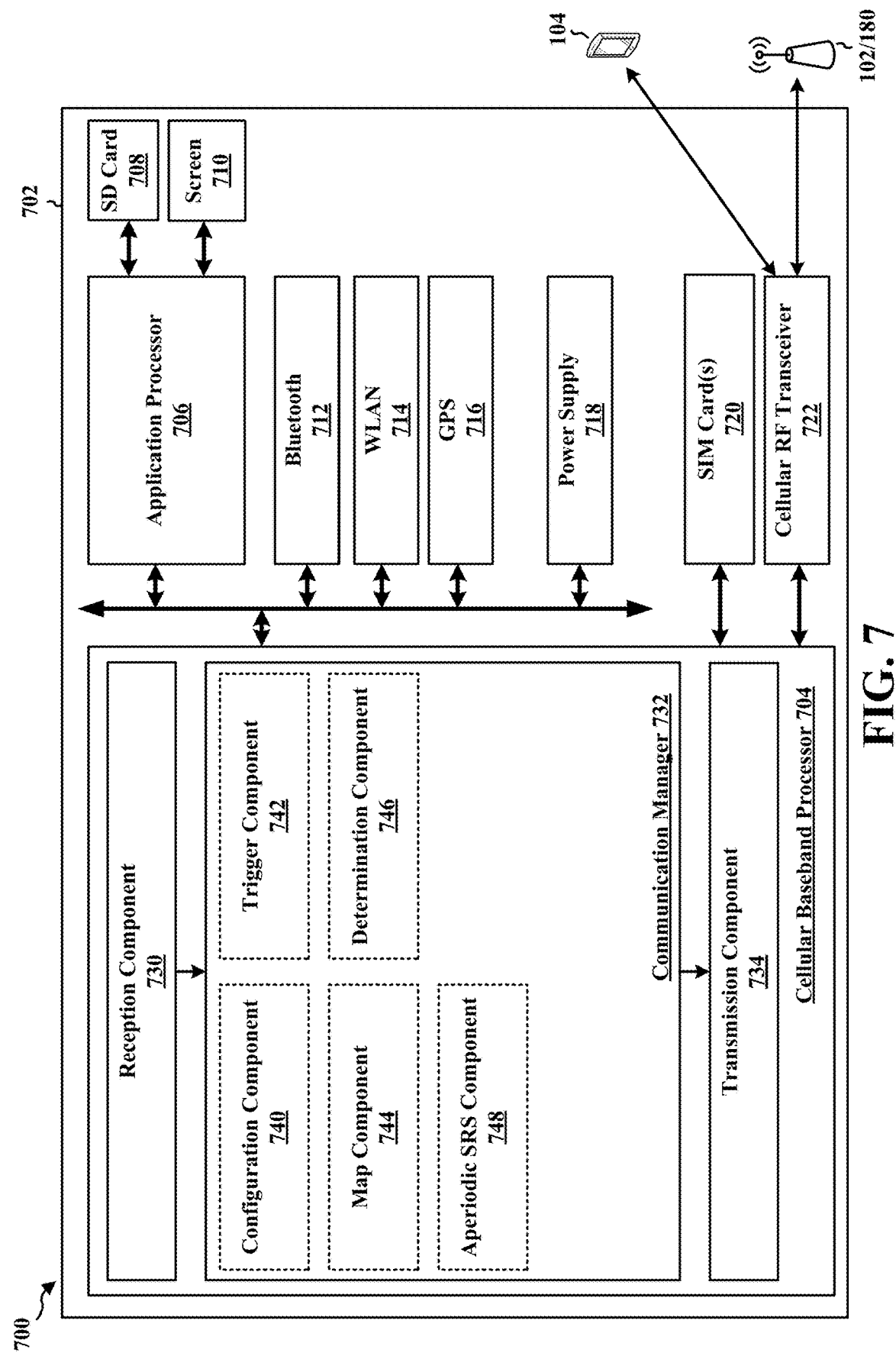
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the cellular baseband processor 704, and in another configuration, the apparatus 702 may be the entire UE (e.g., see 350 of FIG. 3) and include the aforediscussed additional modules of the apparatus 702.

The communication manager 732 includes a configuration component 740 that is configured to receive a configuration activating a subset of configured SRS trigger states, e.g., as described in connection with 602 of FIG. 6. The communication manager 732 further includes a trigger component 742 that is configured to receive a DCI in a PDCCH triggering an aperiodic SRS transmission, e.g., as described in connection with 604 of FIG. 6. The communication manager 732 further includes a map component 744 that is configured to receive a mapping between activated SRS trigger states and a set of codepoint values, e.g., as described in connection with 606 of FIG. 6. The communication manager 732 further includes a determination component 746 that is configured to determine an aperiodic SRS resource set, e.g., as described in connection with 608 of FIG. 6. The communication manager 732 further includes an aperiodic SRS component 748 that is configured to transmit aperiodic SRS within the aperiodic SRS resource set, e.g., as described in connection with 610 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving a configuration activating a subset of configured SRS trigger states. The apparatus includes means for receiving DCI in a PDCCH triggering an aperiodic SRS transmission based on one or more SRS trigger states of activated SRS trigger states. The apparatus includes means for determining an aperiodic SRS resource set based on the configuration and the DCI indicating the one or more SRS trigger states. The apparatus includes means for transmitting aperiodic SRS within the aperiodic SRS resource set. The aforementioned means may be one or more of the aforementioned components of the apparatus 702 configured to perform the functions recited by the aforementioned means.

As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
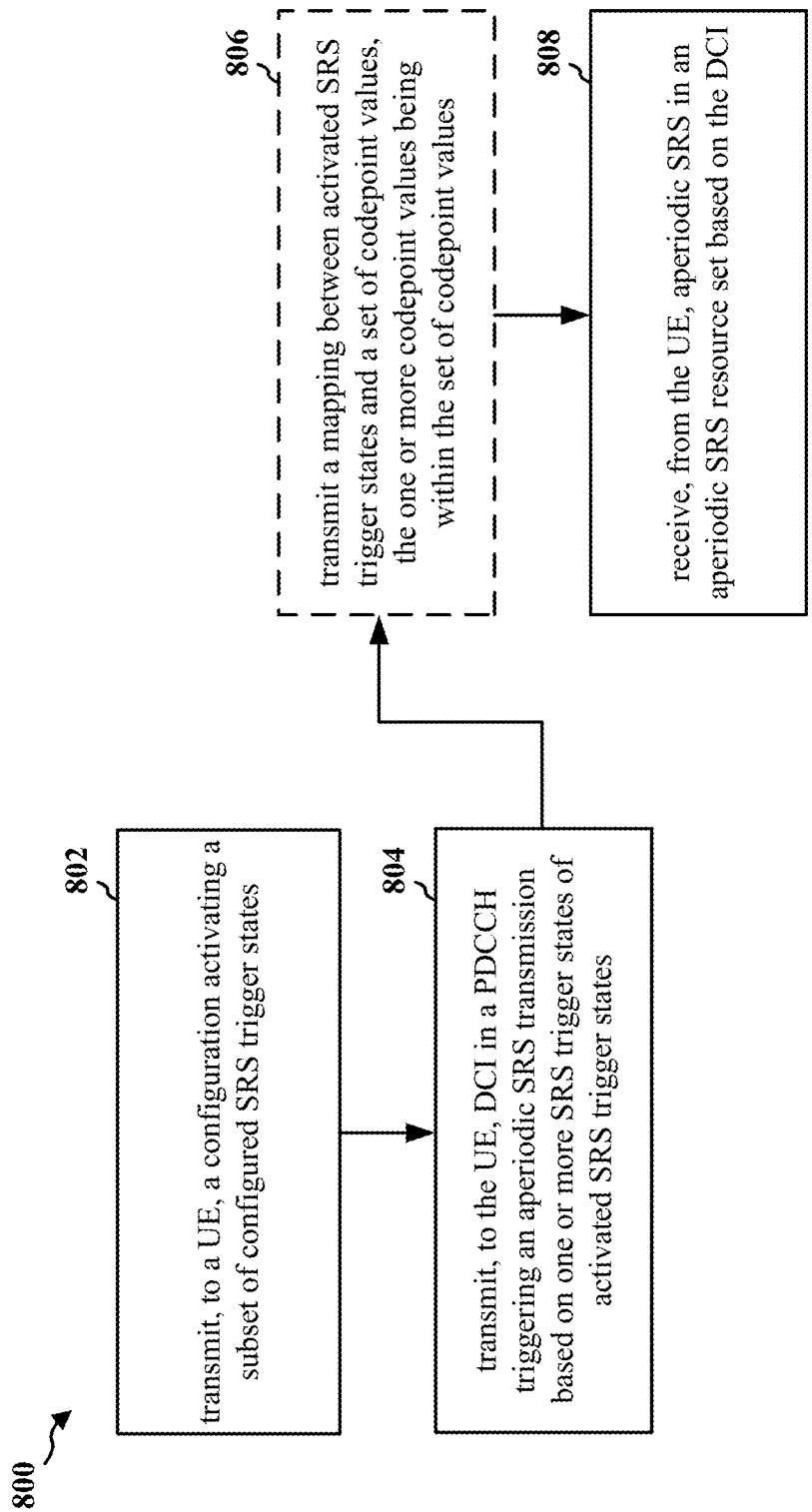
FIG. 8 is a flowchart of a method of wireless communication.

FIG. 8 is a flowchart 800 of a method of wireless communication. The method may be performed by a base station or a component of a base station (e.g., the base station 102/180; the apparatus 902; the baseband unit 904, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to configure a UE to activate a subset of configured SRS trigger states.

At 802, the base station transmits, to a UE, a configuration activating a subset of configured SRS trigger states. For example, 802 may be performed by configuration component 940 of apparatus 902. For example, the base station 404 may transmit the SRS trigger state configuration 406/500 to the UE 402 (as described with reference to FIGS. 4 and 5). In some aspects, the base station transmits the configuration through a MAC-CE.

At 804, the base station transmits, to the UE, DCI in PDCCH triggering an aperiodic SRS transmission. For example, 804 may be performed by trigger component 942 of apparatus 902. The base station may transmit, to the UE, the DCI in the PDCCH triggering the aperiodic SRS transmission based on one or more SRS trigger states of the activated SRS trigger states. For example, the base station 404 may transmit to the UE 402, the DCI 407 in the PDCCH as described in FIG. 4. In some aspects, the DCI includes one or more codepoint values indicating the one or more SRS trigger states of the activated SRS trigger states. In some aspects, each of the activated SRS trigger states is associated with at least one of time-frequency resources, a timing behavior, or a TCI state for transmitting an aperiodic SRS by the UE. In some aspects, each of the activated SRS trigger states is associated with a TCI state for transmitting the aperiodic SRS by the UE.

In some aspects, for example at 806, the base station transmits a mapping between activated SRS trigger states and a set of codepoint values. For example, 806 may be performed by map component 944 of apparatus 902. In some aspects, the one or more codepoint values may be within the set of codepoint values.

At 808, the base station receives, from the UE, aperiodic SRS in an aperiodic SRS resource set. For example, 808 may be performed by aperiodic SRS component 946 of apparatus 902. The base station may receive the aperiodic SRS in the aperiodic SRS resource set based on the DCI. For example, the base station 404 may receive from the UE 402, the aperiodic SRS 410 in the aperiodic SRS resource set 408 based on the transmitted DCI 407, as described with reference to FIG. 4. In some aspects, the aperiodic SRS is received based on the at least one of the time-frequency resources, the timing behavior, or the TCI state associated with the one or more SRS trigger states. In some aspects, the aperiodic SRS may be associated with a QCL property that is the same or similar as a reference signal associated with the one or more SRS trigger states (e.g., the one or more SRS trigger states indicated by the DCI 407, as described above with reference to FIG. 4). The QCL property may include at least one of a one or more port indications, a Doppler shift, a Doppler spread, an average delay, a delay spread, a spatial Tx parameter, or a spatial Rx parameter. The reference signal may be further associated with a panel ID of the UE. In some aspects, the reference signal is one of SRS, or DL RS. The DL RS may be one of CSI-RS, DM-RS for at least one of a PDSCH or a PDCCH, or a SS/PBCH block.

Figure 9:
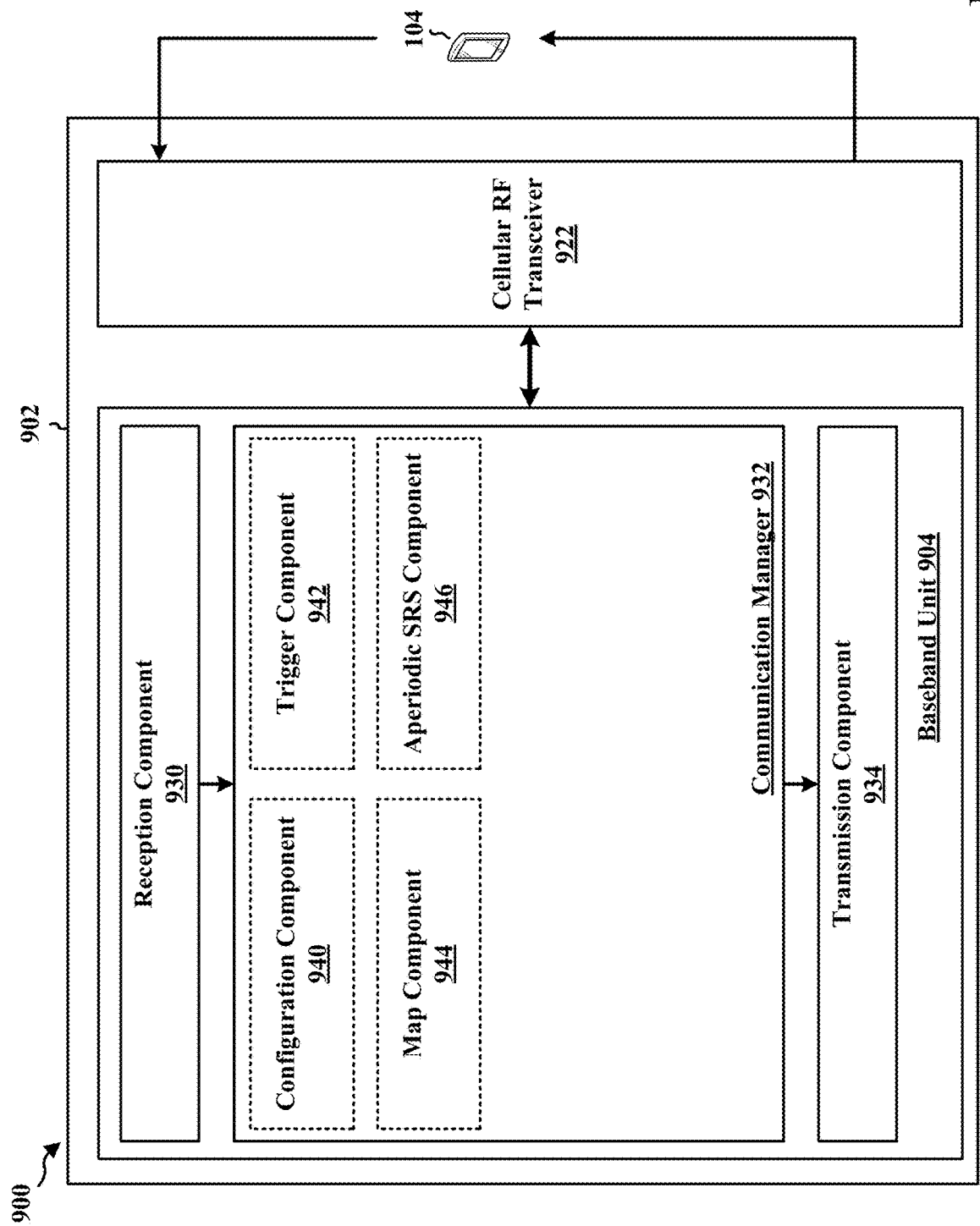
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a configuration component 940 that is configured transmits, to a UE, a configuration activating a subset of configured SRS trigger states, e.g., as described in connection with 802 of FIG. 8. The communication manager 932 further includes a trigger component 942 that transmits, to the UE, DCI in PDCCH triggering an aperiodic SRS transmission, e.g., as described in connection with 804 of FIG. 8. The communication manager 932 further includes a map component 944 that transmits a mapping between activated SRS trigger states and a set of codepoint values, e.g., as described in connection with 806 of FIG. 8. The communication manager 932 further includes an aperiodic SRS component 946 that receives, from the UE, aperiodic SRS in an aperiodic SRS resource set, e.g., as described in connection with 808 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting, to a UE, a configuration activating a subset of configured SRS trigger states. The apparatus includes means for transmitting, to the UE, DCI in a PDCCH triggering an aperiodic SRS transmission based on one or more SRS trigger states of activated SRS trigger states. The apparatus includes means for receiving, from the UE, aperiodic SRS in an aperiodic SRS resource set based on the DCI. The apparatus further includes means for transmitting a mapping between activated SRS trigger states and a set of codepoint values, the one or more codepoint values being within the set of codepoint values. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The aforementioned aperiodic SRS framework may facilitate a subset of configured SRS trigger states that can be activated by DCI/MAC-CE through dynamic usage of control signalling (as opposed to RRC, as discussed above in FIGS. 4-9). Also, content per SRS trigger state may be configured by the RRC. Further, content of the aperiodic SRS trigger state sub-selection DCI/MAC-CE can be similar to the MAC-CE for aperiodic CSI-RS trigger state sub-selection. The activated SRS trigger states may be sequentially mapped to an SRS trigger state codepoint index in the triggering DCI.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a UE comprising receiving a configuration activating a subset of configured SRS trigger states; receiving DCI in a PDCCH triggering an aperiodic SRS transmission based on one or more SRS trigger states of activated SRS trigger states; determining an aperiodic SRS resource set based on the configuration and the DCI indicating the one or more SRS trigger states; and transmitting aperiodic SRS within the aperiodic SRS resource set.

In Aspect 2, the method of Aspect 1 further includes that the configuration is received through a MAC-CE.

In Aspect 3, the method of Aspect 1 or 2 further includes that the DCI includes one or more codepoint values indicating the one or more SRS trigger states of the activated SRS trigger states.

In Aspect 4, the method of any of Aspects 1-3 further includes receiving a mapping between activated SRS trigger states and a set of codepoint values, the one or more codepoint values being within the set of codepoint values.

In Aspect 5, the method of any of Aspects 1-4 further includes that each of the activated SRS trigger states is associated with at least one of time-frequency resources, a timing behavior, or a TCI state for transmitting the aperiodic SRS, and wherein the aperiodic SRS is transmitted based on the at least one of the time-frequency resources, the timing behavior, or the TCI state associated with the one or more SRS trigger states.

In Aspect 6, the method of any of Aspects 1-5 further includes that each of the activated SRS trigger states is associated with a TCI state for transmitting the aperiodic SRS, and wherein the transmitting the aperiodic SRS comprises transmitting the aperiodic SRS with a QCL property similar as a reference signal associated with the one or more SRS trigger states.

In Aspect 7, the method of any of Aspects 1-6 further includes that the reference signal is further associated with a panel ID of the UE.

In Aspect 8, the method of any of Aspects 1-7 further includes that the QCL property comprises at least one of a one or more port indications, a Doppler shift, a Doppler spread, an average delay, a delay spread, a spatial Tx parameter, or a spatial Rx parameter.

In Aspect 9, the method of any of Aspects 1-8 further includes that the reference signal is one of SRS, or a DL RS.

In Aspect 10, the method of any of Aspects 1-9 further includes that the DL RS is one of CSI-RS, DM-RS for at least one of a PDSCH or a PDCCH, or an SS/PBCH block.

Aspect 11 is a device including one or more processors and one or more memories in electronic communication with the one or more processors storing instructions executable by the one or more processors to cause the system or apparatus to implement a method as in any of Aspects 1-10.

Aspect 12 is a system or apparatus including means for implementing a method or realizing an apparatus as in any of Aspects 1-10.

Aspect 13 is a non-transitory computer readable medium storing instructions executable by one or more processors to cause the one or more processors to implement a method as in any of Aspects 1-10.

Aspect 14 is a method of wireless communication at a base station comprising transmitting, to a UE, a configuration activating a subset of configured SRS trigger states; transmitting, to the UE, DCI in a PDCCH triggering an aperiodic SRS transmission based on one or more SRS trigger states of activated SRS trigger states; and receiving, from the UE, aperiodic SRS in an aperiodic SRS resource set based on the DCI.

In Aspect 15, the method of Aspect 14 further includes that the configuration is transmitted through a MAC-CE.

In Aspect 16, the method of Aspect 14 or 15 further includes that the DCI include s one or more codepoint values indicating the one or more SRS trigger states of the activated SRS trigger states.

In Aspect 17, the method of any of Aspects 14-16 further includes transmitting a mapping between activated SRS trigger states and a set of codepoint values, the one or more codepoint values being within the set of codepoint values.

In Aspect 18, the method of any of Aspects 14-17 further includes that each of the activated SRS trigger states is associated with at least one of time-frequency resources, a timing behavior, or a TCI state for transmitting the aperiodic SRS by the UE, and wherein the aperiodic SRS is received based on the at least one of the time-frequency resources, the timing behavior, or the TCI state associated with the one or more SRS trigger states.

In Aspect 19, the method of any of Aspects 14-18 further includes that each of the activated SRS trigger states is associated with a TCI state for transmitting the aperiodic SRS by the UE, and wherein the aperiodic SRS is associated with a QCL property similar as a reference signal associated with the one or more SRS trigger states.

In Aspect 20, the method of any of Aspects 14-19 further includes that the reference signal is further associated with a panel ID of the UE.

In Aspect 21, the method of any of Aspects 14-20 further includes that the QCL property comprises at least one of a one or more port indications, a Doppler shift, a Doppler spread, an average delay, a delay spread, a spatial Tx parameter, or a spatial Rx parameter.

In Aspect 22, the method of any of Aspects 14-21 further includes that the reference signal is one of SRS, or a DL RS.

In Aspect 23, the method of any of Aspects 14-22 further includes that the DL RS is one of CSI-RS, DM-RS for at least one of a PDSCH or a PDCCH, or an SS/PBCH block.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving a configuration activating a subset of configured sounding reference signal (SRS) trigger states;
    receiving downlink control information (DCI) in a physical downlink control channel (PDCCH) triggering an aperiodic SRS transmission based on one or more SRS trigger states of activated SRS trigger states, wherein the DCI includes one or more codepoint values indicating the one or more SRS trigger states of the activated SRS trigger states;
    receiving a mapping between the activated SRS trigger states and a set of codepoint values, the one or more codepoint values being within the set of codepoint values;
    determining an aperiodic SRS resource set based on the configuration and the DCI indicating the one or more SRS trigger states; and
    transmitting aperiodic SRS within the aperiodic SRS resource set.

2. The method of claim 1, wherein the configuration is received through a medium access control (MAC) control element (CE) (MAC-CE).

3. The method of claim 1, wherein each of the activated SRS trigger states is associated with at least one of time-frequency resources, a timing behavior, or a transmission control indicator (TCI) state for transmitting the aperiodic SRS, and wherein the aperiodic SRS is transmitted based on the at least one of the time-frequency resources, the timing behavior, or the TCI state associated with the one or more SRS trigger states.

4. A method of wireless communication at a user equipment (UE), comprising:
    receiving a configuration activating a subset of configured sounding reference signal (SRS) trigger states;
    receiving downlink control information (DCI) in a physical downlink control channel (PDCCH) triggering an aperiodic SRS transmission based on one or more SRS trigger states of activated SRS trigger states;
    determining an aperiodic SRS resource set based on the configuration and the DCI indicating the one or more SRS trigger states; and
    transmitting aperiodic SRS within the aperiodic SRS resource set, wherein each of the activated SRS trigger states is associated with a transmission control indicator (TCI) state for transmitting the aperiodic SRS, and wherein the transmitting the aperiodic SRS comprises transmitting the aperiodic SRS with a quasi-co location (QCL) property similar as a reference signal associated with the one or more SRS trigger states.

5. The method of claim 4, wherein the reference signal is further associated with a panel identifier (ID) of the UE.

6. The method of claim 4, wherein the QCL property comprises at least one of a one or more port indications, a Doppler shift, a Doppler spread, an average delay, a delay spread, a spatial transmit (Tx) parameter, or a spatial receive (Rx) parameter.

7. The method of claim 4, wherein the reference signal is one of sounding reference signals (SRS), or a downlink (DL) reference signal (RS).

8. The method of claim 7, wherein the DL RS is one of channel state information (CSI) RS (CSI-RS), demodulation RS (DM-RS) for at least one of a physical downlink shared channel (PDSCH) or the PDCCH, or a synchronization signal/physical broadcast channel (PBCH) (SS/PBCH) block.

9. An apparatus for wireless communication at a user equipment (UE), comprising:
    a memory; and
    at least one processor coupled to the memory and configured to:
        receive a configuration activating a subset of configured sounding reference signal (SRS) trigger states;
        receive downlink control information (DCI) in a physical downlink control channel (PDCCH) triggering an aperiodic SRS transmission based on one or more SRS trigger states of activated SRS trigger states, wherein the DCI includes one or more codepoint values indicating the one or more SRS trigger states of the activated SRS trigger states;
receive a mapping between the activated SRS trigger states and a set of codepoint values, the one or more codepoint values being within the set of codepoint values;
determine an aperiodic SRS resource set based on the configuration and the DCI indicating the one or more SRS trigger states; and
transmit aperiodic SRS within the aperiodic SRS resource set.

10. The apparatus of claim 9, wherein each of the activated SRS trigger states is associated with at least one of time-frequency resources, a timing behavior, or a transmission control indicator (TCI) state for transmitting the aperiodic SRS, and wherein the aperiodic SRS is transmitted based on the at least one of the time-frequency resources, the timing behavior, or the TCI state associated with the one or more SRS trigger states.

11. The apparatus of claim 9, wherein each of the activated SRS trigger states is associated with a transmission control indicator (TCI) state for transmitting the aperiodic SRS, and wherein the at least one processor is further configured to:
transmit the aperiodic SRS is further configured to transmit the aperiodic SRS with a quasi-co location (QCL) property similar as a reference signal associated with the one or more SRS trigger states.

12. A method of wireless communication of a base station (BS), comprising:
transmitting, to a user equipment (UE), a configuration activating a subset of configured sounding reference signal (SRS) trigger states;
transmitting, to the UE, downlink control information (DCI) in a physical downlink control channel (PDCCH) triggering an aperiodic SRS transmission based on one or more SRS trigger states of activated SRS trigger states, wherein the DCI includes one or more codepoint values indicating the one or more SRS trigger states of the activated SRS trigger states;
transmitting a mapping between the activated SRS trigger states and a set of codepoint values, the one or more codepoint values being within the set of codepoint values; and
receiving, from the UE, aperiodic SRS in an aperiodic SRS resource set based on the DCI.

13. The method of claim 12, wherein the configuration is transmitted through a medium access control (MAC) control element (CE) (MAC-CE).

14. The method of claim 12, wherein each of the activated SRS trigger states is associated with at least one of time-frequency resources, a timing behavior, or a transmission control indicator (TCI) state for transmitting the aperiodic SRS by the UE, and wherein the aperiodic SRS is received based on the at least one of the time-frequency resources, the timing behavior, or the TCI state associated with the one or more SRS trigger states.

15. A method of wireless communication of a base station (BS), comprising:
transmitting, to a user equipment (UE), a configuration activating a subset of configured sounding reference signal (SRS) trigger states;
transmitting, to the UE, downlink control information (DCI) in a physical downlink control channel (PDCCH) triggering an aperiodic SRS transmission based on one or more SRS trigger states of activated SRS trigger states; and receiving, from the UE, aperiodic SRS in an aperiodic SRS resource set based on the DCI, wherein each of the activated SRS trigger states is associated with a transmission control indicator (TCI) state for transmitting the aperiodic SRS by the UE, and wherein the aperiodic SRS is associated with a quasi-co location (QCL) property similar as a reference signal associated with the one or more SRS trigger states.

16. The method of claim 15, wherein the reference signal is further associated with a panel identifier (ID) of the UE.

17. The method of claim 15, wherein the QCL property comprises at least one of a one or more port indications, a Doppler shift, a Doppler spread, an average delay, a delay spread, a spatial transmit (Tx) parameter, or a spatial receive (Rx) parameter.

18. The method of claim 15, wherein the reference signal is one of sounding reference signals (SRS), or a downlink (DL) reference signal (RS).

19. The method of claim 18, wherein the DL RS is one of channel state information (C SI) RS (CSI-RS), demodulation RS (DM-RS) for at least one of a physical downlink shared channel (PDSCH) or the PDCCH, or a synchronization signal/physical broadcast channel (PBCH) (SS/PBCH) block.

20. An apparatus for wireless communication, the apparatus being a base station (BS), comprising:
a memory; and
at least one processor coupled to the memory and configured to:
transmit, to a user equipment (UE), a configuration activating a subset of configured sounding reference signal (SRS) trigger states;
transmit, to the UE, downlink control information (DCI) in a physical downlink control channel (PDCCH) triggering an aperiodic SRS transmission based on one or more SRS trigger states of activated SRS trigger states, wherein the DCI includes one or more codepoint values indicating the one or more SRS trigger states of the activated SRS trigger states;
transmit a mapping between activated SRS trigger states and a set of codepoint values, the one or more codepoint values being within the set of codepoint values; and
receive, from the UE, aperiodic SRS in an aperiodic SRS resource set based on the DCI.

21. The apparatus of claim 20, wherein each of the activated SRS trigger states is associated with at least one of time-frequency resources, a timing behavior, or a transmission control indicator (TCI) state for transmitting the aperiodic SRS by the UE, and wherein the aperiodic SRS is received based on the at least one of the time-frequency resources, the timing behavior, or the TCI state associated with the one or more SRS trigger states.

22. An apparatus for wireless communication, the apparatus being a base station (BS), comprising:
a memory; and
at least one processor coupled to the memory and configured to:
transmit, to a user equipment (UE), a configuration activating a subset of configured sounding reference signal (SRS) trigger states;
transmit, to the UE, downlink control information (DCI) in a physical downlink control channel (PDCCH) triggering an aperiodic SRS transmission based on one or more SRS trigger states of activated SRS trigger states; and receive, from the UE, aperiodic SRS in an aperiodic SRS resource set based on the DCI, wherein each of the activated SRS trigger states is associated with a transmission control indicator (TCI) state for transmitting the aperiodic SRS by the UE, and wherein the aperiodic SRS is associated with a quasi-co location (QCL) property similar as a reference signal associated with the one or more SRS trigger states.

* * * * *